United States Patent [19]

Oshima

[11] 4,392,559
[45] Jul. 12, 1983

[54] DISC BRAKE HAVING SLIDABLY MOUNTED CALIPER WITH FRICTION PAD SUPPORTING MEMBER PROVIDED THEREON

[75] Inventor: Harumi Oshima, Kawasaki, Japan
[73] Assignee: Tokico Ltd., Kawasaki, Japan
[21] Appl. No.: 233,208
[22] Filed: Feb. 10, 1981

[30] Foreign Application Priority Data

Feb. 16, 1980 [JP] Japan ............................ 55-19013[U]
Feb. 16, 1980 [JP] Japan ............................ 55-19014

[51] Int. Cl.³ ..................... F16D 55/224; F16D 65/04
[52] U.S. Cl. ............................ 188/73.32; 188/73.35; 188/73.45
[58] Field of Search ............... 188/73.31, 73.32, 73.33, 188/73.35, 73.39, 73.43, 73.44, 73.45, 205 A, 206 R; 192/30 V, 70.13

[56] References Cited

U.S. PATENT DOCUMENTS

| | | | |
|---|---|---|---|
| 3,532,192 | 10/1970 | Falk | 188/73.43 |
| 3,782,510 | 1/1974 | Rath | 188/73.43 |
| 4,030,577 | 6/1977 | Ogawa et al. | 188/73.31 |
| 4,225,017 | 9/1980 | Op den Camp | 188/73.39 |
| 4,265,342 | 5/1981 | Karasudani | 188/73.32 |

FOREIGN PATENT DOCUMENTS 2515404 10/1975 Fed. Rep. of Germany ... 188/73.35

Primary Examiner—Douglas C. Butler
Assistant Examiner—R. R. Diefendorf
Attorney, Agent, or Firm—Fleit, Jacobson & Cohn

[57] ABSTRACT

A disc brake comprising a caliper slidably mounted on a stationary member and adapted to be disassembled therefrom in the radially outward direction with respect to a rotatable disc. The caliper incorporates a brake actuator in one limb portion thereof for pressing one friction pad against one surface of the disc and has the other limb portion for transmitting brake applying force to the other friction pad. A pad supporting member is provided on the caliper for suspending at least one friction pad from the caliper when the caliper and the friction pad are disassembled from the caliper; and the pad supporting member is spaced from the friction pad such that any force is transmitted through the pad supporting member when the caliper and the friction pad are assembled with the stationary member.

5 Claims, 8 Drawing Figures

DISC BRAKE HAVING SLIDABLY MOUNTED CALIPER WITH FRICTION PAD SUPPORTING MEMBER PROVIDED THEREON

BACKGROUND OF THE INVENTION

This invention relates to improvements in disc brakes and, particularly, to so-called floating caliper type disc brakes wherein a caliper is slidably mounted on a stationary member and straddling the circumference of a rotatable disc, with one limb portion thereof incorporating a brake actuator such as a cylinder piston device for applying one friction pad against one surface of the disc, and the other limb portion thereof being adapted to apply another friction pad against the other surface of the disc.

Recently, there has been proposed a disc brake wherein the stationary member of the disc brake is integral with the body of a vehicle. In such case, when the caliper is disassembled from the stationary member, the friction pads will separate from the caliper; thus, there are problems such that the caliper and the friction pads must be handled separately thus complicating the controlling of parts, and that the assembling and disassembling operation is troublesome and time consuming.

In some prior art disc brakes, friction pads are retained by a pair of axially extending parallel pins passing through openings or recesses formed in backing plates of friction pads, and the pins are mounted on the caliper or on the stationary member. The pins slidably guide the friction pads; thus, there is a problem that the pins and the friction pads will be worn. As a result, the pad exchanging operation is relatively difficult.

SUMMARY OF THE INVENTION

An object of the present invention is to solve the problems aforementioned, and the disc brake according to the invention comprises a caliper which is mounted slidably on a stationary member and is adapted to be dismounted therefrom in the radially outward direction with respect to a rotatable disc. The caliper has in one limb portion thereof a brake actuator such as a cylinder piston device for pressing one friction pad which is disposed on one surface of a rotatable disc and is supported slidably on the stationary member, and another limb portion thereof being adapted to press another friction pad against the other surface of the disc, and a pad supporting member provided on the caliper for supporting at least one friction pad on the caliper when the caliper and the friction pad are disassembled from the stationary member. The pad supporting member is spaced from the friction pad in the assembled condition.

Preferably, the pad supporting member is one or two pins which extend in the direction of the axis of the disc and being loosely received in recesses which are provided in the friction pad. When the caliper and the friction pad are disassembled from the stationary member, the pins engage with radially outward walls of the recesses thereby suspending the friction pad from the caliper. Thus, the assembling and disassembling operations can be simplified.

The invention will now be explained in detail with reference to accompanying drawings exemplifying some preferred embodiments of the invention.

DETAILED DESCRIPTION OF THE PREFERRED EMBODIMENTS

Figure 1:
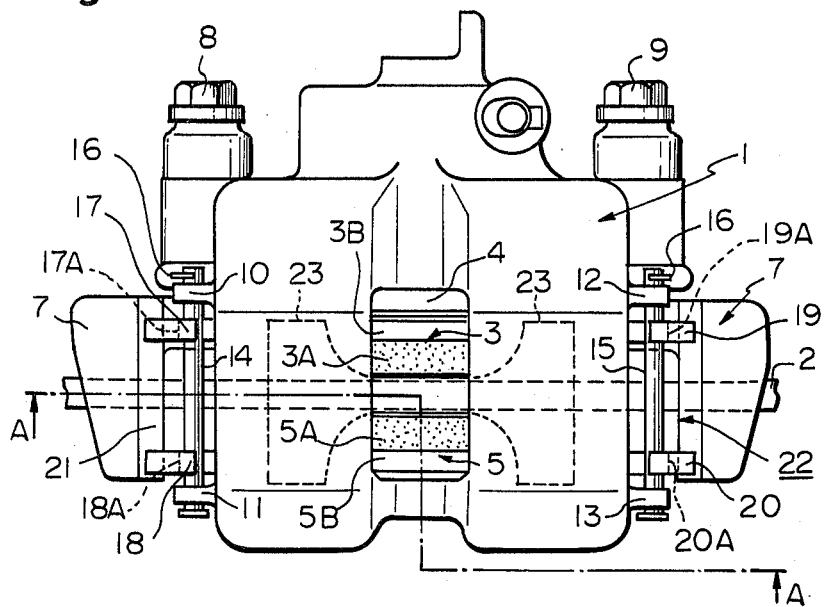
FIG. 1 is a plan view of a disc brake according to the invention.
Figure 2:
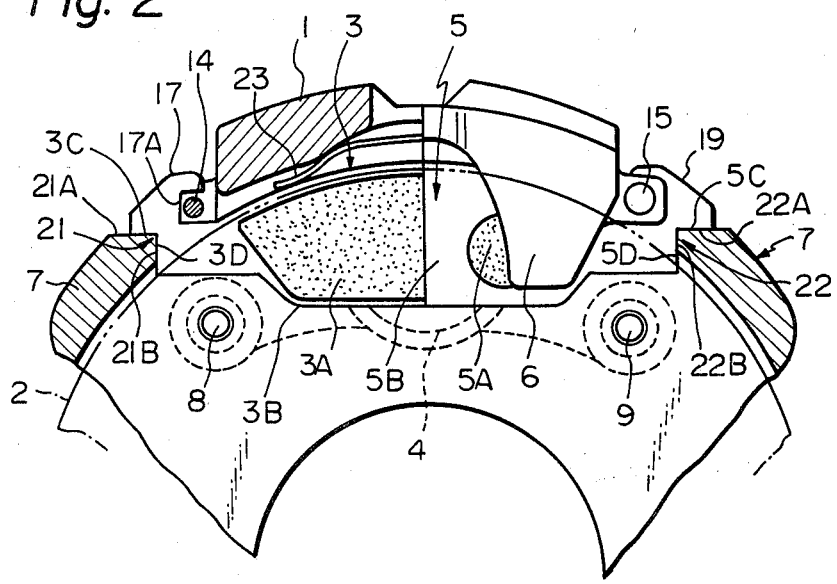
FIG. 2 is a half sectional side view as viewed along line A—A in FIG. 1.
Figure 3:
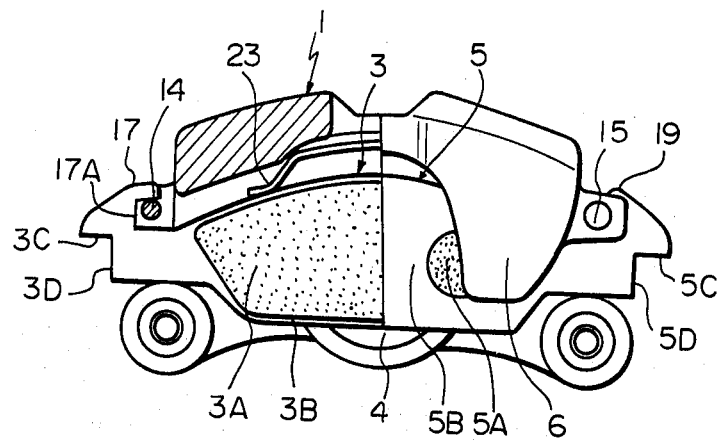
FIG. 3 is a view similar to FIG. 2 but showing the disassembled conditon.

The disc brake shown in FIGS. 1-3 essentially comprises a caliper 1 and a pair of friction pads 3 and 5. The friction pad 3 consisting of friction material 3A and a backing plate 3B is disposed on one side (the upper side as viewed in FIG. 1) of a rotatable disc 2, and the friction pad 5 consisting of friction material 5A and a backing plate 5B is disposed on the other side of the disc 2. The caliper 1 has generally an inverted U-shape in the side view to straddle the outer circumference of the disc 2 and incorporates in one limb portion thereof a brake actuator including a piston 4 for pressing the friction pad 3 against the disc 2. Another limb portion 6 of the caliper 1 engages with the backing plate 5B of the friction pad 5 to apply the same against the disc 2. The caliper 1 is adapted to be slidably mounted on a stationary member 7, which is integral with a wheel axle of a vehicle, through pins 8 and 9. In the embodiment, the stationary member 7 has circumferentially spaced arms 21 and 22 which straddle respectively the circumference of the disc 2 and support therebetween the friction pads 3 and 5 slidably in the direction of the axis of the disc 2 and, also, receive braking torque from the friction pads in applying the brake.

According to the invention there are provided lugs 10, 11, 12 and 13 on the right and left sides of the caliper 1 and on the opposite sides of the disc 2. A pair of pins 14 and 15 acting as the pad supporting member according to the invention are mounted respectively on the lugs 10 and 11 and the lugs 12 and 13 and extend respectively in the direction of the axis of the disc 2. Shown at 16 are clips for retaining the pins 14 and 15.

There are provided projections 17, 19, 18 and 20 on the circumferentially opposite sides of backing plates 3B and 5B of the friction pads 3 and 5 to define respectively recesses 17A, 19A, 18A and 20A as shown in the drawings. In the normal operating condition or the condition when the caliper 1 and friction pads 3 and 5 have been assembled with the stationary member 7 as shown in FIGS. 1 and 2, the pins 14 and 15 loosely pass through the recesses 17A and 18A and 19A and 20A. As clearly shown in FIG. 2, there are substantial clearances between the walls of the recesses and the pins; thus the pins 14 and 15 do not engage with the recesses in the normal operating condition.

The arm portions 21 and 22 of the supporting member 7 define thereon guiding and supporting surfaces 21A and 22A for supporting downwardly facing guide surfaces 3C and 5C of the backing plates 3B and 5B of the friction pads 3 and 5, and supporting and torque receiving surfaces 21B and 22B for engaging with torque transmitting surfaces 3D and 5D of the backing plates 3B and 5B of the friction pads 3 and 5. There is provided a pad spring 23 between the caliper 1 and the friction pads 3 and 5.

As shown in FIGS. 1 and 2, the friction pads 3 and 5 are supported on arm portions 21 and 22 of the stationary member 7 and are slidable in the direction of the axis of the disc 2. In applying the brake, the piston 4 projects from the caliper 1 to press the friction pad 3 against one surface of the disc 2. The reaction force of the piston 4 acts on the caliper 1 to move the same in the upward direction as seen in FIG. 1, and the limb portion 6 of the caliper 1 presses the friction pad 5 against the other surface of the disc 2. Thus, the disc 2 is clamped between the friction pads 3 and 5 and is braked. The braking torques generated in friction pads 3 and 5 are transmitted to either of the arm portions 21 and 22 through torque transmitting surfaces 3D and 5D. In the normal operating condition heretofore described, the backing plates 3B and 5B of the friction pads 3 and 5 are sufficiently separated from pins 14 and 15 such that any force will not act on pins 14 and 15.

In disassembling the caliper 1 from the stationary member 7, the pins 8 and 9 are removed and the caliper 1 is displaced upward as viewed in FIG. 2. The friction pads 3 and 5 are supported by pins 14 and 15 as shown in FIG. 3 and are also disassembled from the stationary member 7. By extracting the pin 14 or 15, the friction pads can easily be disassembled from the caliper 1. In assembling the caliper 1 with the stationary member 7, the procedure may be reversed. The caliper 1, the friction pads 3 and 5 and the pad spring 23 can be handled as a single unit, thus, assembling and disassembling operations can be performed easily, and the controlling of parts such as storage, transportation, packaging or the like can be simplified and the costs therefor can be reduced.

Figure 4:
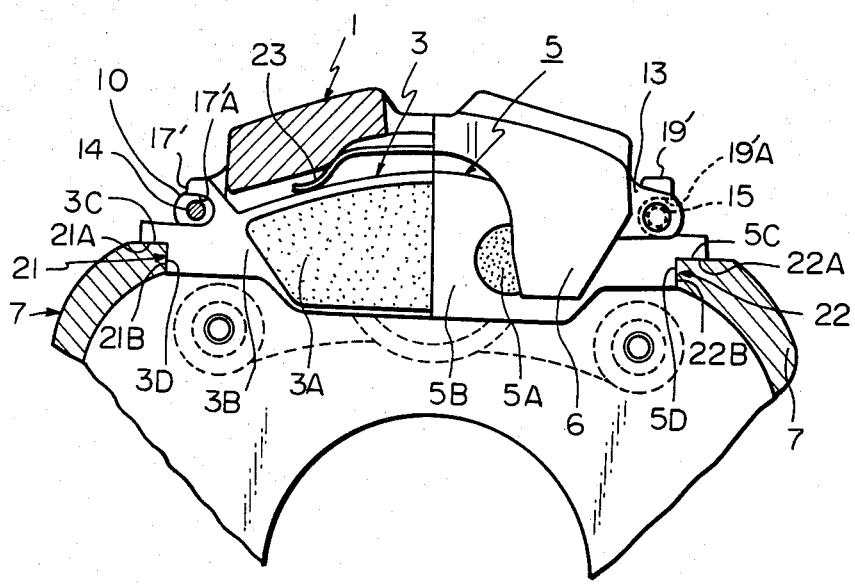
FIG. 4 is a view similar to FIG. 2 but showing a second embodiment of the invention.

FIG. 4 shows a second embodiment of the invention wherein recesses 17'A, 18'A, 19'A and 20'A (recesses 18'A and 20'A are not shown) open respectively in circumferentially outward direction. The disc brake of FIG. 4 is otherwise similar to the disc brake of FIG. 2, and further description is omitted with the same reference numerals being applied to corresponding parts.

Figure 5:
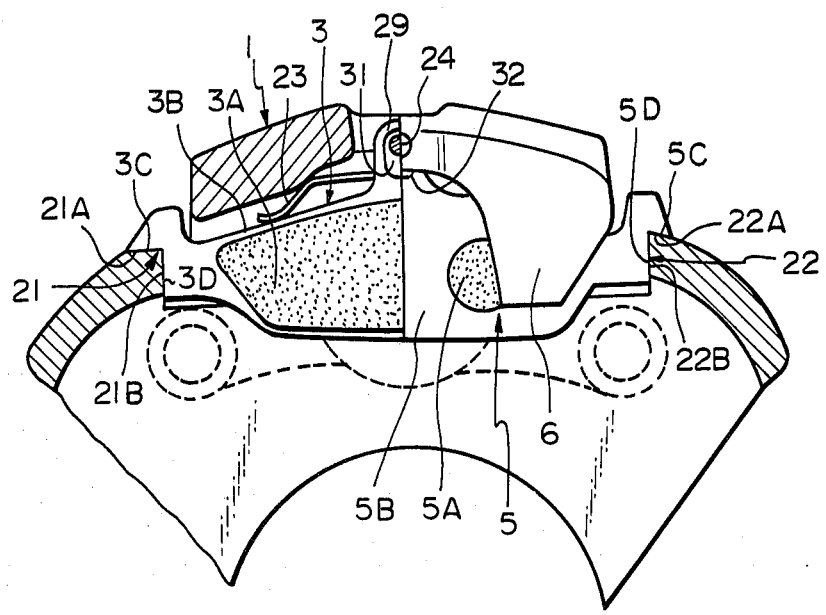
FIG. 5 is a view similar to FIG. 2 but showing a third embodiment of the invention.
Figure 6:
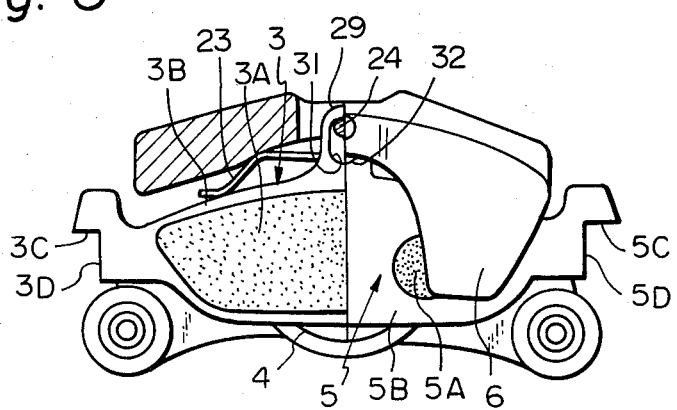
FIG. 6 is a view similar to FIG. 5 but showing the disassembled condition.
Figure 7:
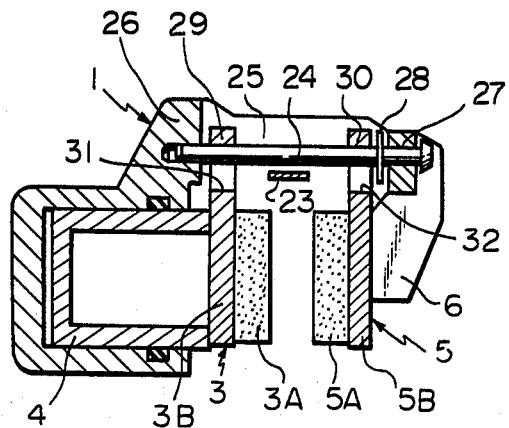
FIG. 7 is a sectional side view of the disc brake of FIG. 6.

FIGS. 5–7 show another embodiment of the invention wherein a pad supporting pin 24 is mounted on the caliper 1 to extend in the direction of the axis of the disc and along the vertical center line of the caliper 1. Openings 31 and 32 are respectively provided in backing plates 3B and 5B of friction pads 3 and 5 respectively to loosely pass therethrough the pin 24. The configuration and the location of openings 31 and 32 are such that when the friction pads 3 and 5 and the caliper 1 is assembled with the stationary member as shown in FIG. 5, the pin 24 does not engage with the friction pads 3 and 5 to avoid the interference therebetween particularly in applying the brake.

When the caliper 1 and the friction pads 3 and 5 are disassembled from the stationary member as shown in FIG. 6, the friction pads 3 and 5 are suspended from the caliper 1 through the pin 24. The disc brake shown in FIGS. 5–7 is otherwise similar to the disc brake of FIGS. 1–3 and the same reference numerals have be applied to corresponding parts.

Figure 8:
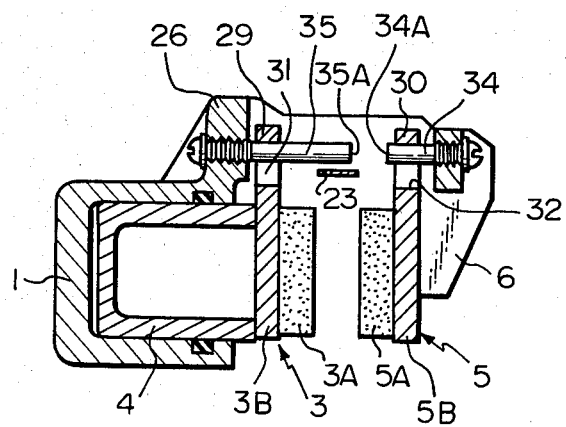
FIG. 8 is a view similar to FIG. 7 but showing a fourth embodiment.

FIG. 8 shows a modified form of FIG. 7 wherein the pin 24 of FIG. 7 is substituted by two axially aligning pins 34 and 35. The pin 34 loosely passes through the opening 35 of the backing plate 5B of the friction pad 5, and the pin 35 loosely passes through the opening 31 of the backing plate 3B of the friction pad 3 when the caliper 1 and the friction pads 3 and 5 are assembled with the stationary member which is not shown in FIG. 8. The adjacent ends 34A and 35A of the pins 34 and 35 are spaced by a distance which is larger than the thickness of the backing plate 3B or 5B of the friction pad. Thus, in the disassembled condition as shown in FIG. 8, the friction pads 5 and 3 can be disassembled from the caliper 1 without removing the pin 34 or 35.

The invention is particularly adapted for disc brakes of the kind wherein the stationary member is integrally formed with a non-rotatable part of the vehicle, however, the stationary member can be removably secured to a nonrotatable part of the vehicle.

As described heretofore, a pad supporting member such as pins 14 and 15, 24, 34 and 35 is provided on the caliper, according to the invention, such that the friction pad is suspended from the caliper through the pad supporting member when the caliper and the friction pad are separated from the stationary member, and that when the caliper and the friction pad are assembled with the stationary member, the friction pad takes the position spaced from the pad supporting member whereby any force is not transmitted between the caliper and the friction pad, thus, the following advantages can be obtained.

(a) The caliper and friction pads can be assembled with or disassembled from the stationary member as a unit, thus, it is possible to avoid troublesome and time consuming assembling or disassembling operations, and when the stationary member is formed integrally with the body of the vehicle, the caliper and friction pads can be handled as a single unit; thus it is advantageous in controlling the parts.

(b) The braking torque generating in the friction pad is transmitted directly to the stationary member, thus, it is possible to prevent the caliper and friction pads from deformation or damage.

Although the pad supporting members shown in the drawings are pins mounted on the caliper and loosely pass through recesses or openings formed in backing plates of the friction pads, the pad supporting member according to the invention is not limited to the embodiments. For example, the pad supporting member according to the invention may pass through recess formed in friction pads of the type without having backing plates. Further, the pad supporting member may be substituted by cords, wires or chains with the opposite ends thereof being connected respectively to caliper and the friction pad such that any force is not transmitted through the pad supporting member in the normal operating condition.

What is claimed is:

1. A disc brake mountable on a stationary member integral with a non-rotatable part of a vehicle and having spaced apart arm portions, each arm portion having a horizontally extending guide and support surface and a vertically extending support and torque receiving surface, said disc brake being used for braking rotation of a rotatable disc and comprising:

a caliper having limb portions and being adapted to be slidably mounted on the stationary member which is integral with a non-rotatable part of a vehicle;

a pair of friction pads, each friction pad having downwardly facing guide surfaces positionable in contact with the horizontally extending guide and support surfaces of said arm portions of said stationary member and a torque transmitting surface for transmitting braking torque to the vertically extending support and torque receiving surfaces of said arm portions of said stationary member;

a brake actuator provided in one limb portion of the caliper for pressing one friction pad against one surface of the rotatable disc; and a pad supporting member provided on the caliper for supporting said friction pads on the caliper when the caliper and friction pads are not mounted on the stationary member, and, when the disc brake is mounted on the stationary member, the relationship between the friction pads and said pad supporting member being such that:

the friction pads are slidably guided and supported on the horizontally-extending guide and support surfaces of the stationary member so that braking torque on the friction pads is directly transmitted to the vertically extending support and torque receiving surfaces of the stationary member; and said pad supporting member is free from contact with the friction pads so that any braking force applied to the pads is transmitted only between the friction pads and stationary member.

2. A disc brake as set forth in claim 1 wherein said pad supporting member comprises at least one pin extending in the direction of the axis of the disc loosely received in a recess provided in the friction pad, the friction pad having a wall radially outwards of the pin when the pad is mounted on the stationary member.

3. A disc brake as set forth in claim 2 wherein two circumferentially spaced parallel pins are mounted on the caliper to loosely pass through respectively recesses which are formed in backing plates of the friction pads and open respectively in sidewise directions.

4. A disc brake as set forth in claim 1 wherein said pad supporting member is a pin extending in the direction of the axis of the disc and passing loosely through openings provided respectively in backing plates of the friction pads when the pads are mounted on the stationary member.

5. A disc brake as set forth in claim 1 wherein said pad supporting member consists of two axially aligned pins secured respectively to said limb portions of the caliper and passing loosely through respective openings of respective backing plates of friction pads when the pads are mounted on the stationary member.

* * * * *